(12) United States Patent
Pellenc et al.

(10) Patent No.: US 10,847,767 B2
(45) Date of Patent: Nov. 24, 2020

(54) PORTABLE BATTERY DEVICE WITH A PASSIVE AIR-COOLING SYSTEM

(71) Applicant: PELLENC (SOCIETE PAR ACTIONS SIMPLIFIEE), Pertuis (FR)

(72) Inventors: Roger Pellenc, Pertuis (FR); Frédéric Fortier, La Bastide des Jourdans (FR)

(73) Assignee: PELLENC (SOCIETE PAR ACTIONS SIMPLIFIEE), Pertuis (FR)

( * ) Notice: Subject to any disclaimer, the term of this patent is extended or adjusted under 35 U.S.C. 154(b) by 63 days.

(21) Appl. No.: 16/334,995

(22) PCT Filed: Sep. 7, 2017

(86) PCT No.: PCT/FR2017/052383
§ 371 (c)(1),
(2) Date: Mar. 20, 2019

(87) PCT Pub. No.: WO2018/055256
PCT Pub. Date: Mar. 29, 2018

(65) Prior Publication Data
US 2019/0267585 A1 Aug. 29, 2019

(30) Foreign Application Priority Data
Sep. 20, 2016 (FR) ...................................... 16 58791

(51) Int. Cl.
*H01M 4/02* (2006.01)
*H01M 2/10* (2006.01)
(Continued)

(52) U.S. Cl.
CPC ......... *H01M 2/105* (2013.01); *H01M 2/1022* (2013.01); *H01M 2/1077* (2013.01);
(Continued)

(58) Field of Classification Search
CPC ...................................................... H01M 4/02
See application file for complete search history.

(56) References Cited

U.S. PATENT DOCUMENTS

| 3,219,485 A | 11/1965 | Foecking et al. |
| 2001/0046624 A1 | 11/2001 | Goto et al. |

(Continued)

FOREIGN PATENT DOCUMENTS

| CN | 202 282 401 U | 6/2012 |
| EP | 2 477 253 A1 | 7/2012 |

(Continued)

OTHER PUBLICATIONS

International Search Report, dated Nov. 7, 2017, from corresponding PCT/FR2017/052383 application.

*Primary Examiner* — Jacob B Marks
(74) *Attorney, Agent, or Firm* — IPSILON USA, LLP

(57) ABSTRACT

Disclosed is a portable battery device including a casing and a battery unit housed therein, and consisting of a plurality of battery elements. The battery device includes a surface unit for compartmentalizing the internal volume of the casing, defining sealed housings, the ends of the elements come respectively into supporting engagement, by or with the opposite end portions of the bodies of the battery elements, with the opposite compartmentalizing unit. The remaining parts of the bodies of the elements situated between the opposite compartmentalizing element are directly exposed to the outside environment through perforated or discontinuous portions of the wall of the casing.

23 Claims, 10 Drawing Sheets

(51) Int. Cl.
*H01M 10/613* (2014.01)
*H01M 10/6562* (2014.01)
*H01M 2/20* (2006.01)
*H01M 10/0525* (2010.01)

(52) U.S. Cl.
CPC ....... *H01M 2/204* (2013.01); *H01M 10/0525* (2013.01); *H01M 10/613* (2015.04); *H01M 10/6562* (2015.04)

(56) References Cited

U.S. PATENT DOCUMENTS

| | | |
|---|---|---|
| 2003/0134189 A1 | 7/2003 | Kanai et al. |
| 2009/0274952 A1 | 11/2009 | Wood et al. |
| 2010/0021802 A1 | 1/2010 | Yang et al. |
| 2010/0136413 A1 | 6/2010 | Hermann et al. |
| 2011/0293998 A1 | 12/2011 | Sato et al. |
| 2012/0237803 A1* | 9/2012 | Mardall .................. B60L 50/66 429/53 |
| 2013/0122341 A1 | 5/2013 | De Paoli et al. |

FOREIGN PATENT DOCUMENTS

| | | |
|---|---|---|
| JP | 2001 155702 A | 6/2001 |
| WO | 2013/139409 A1 | 9/2013 |

* cited by examiner

PORTABLE BATTERY DEVICE WITH A PASSIVE AIR-COOLING SYSTEM

This invention relates to the field of autonomous power supply sources, in particular the power battery systems that can be transported, and even carried, by the user (generally on his back), and has as its object a portable battery device that integrates a passive air-cooling system.

Numerous embodiments of portable batteries ("battery pack" in English) for the powering of power tools are already known in the state of the art.

Such a battery unit generally consists of an assembly of a number of battery elements with elongated airtight bodies, preferably cylindrical in shape, comprising two opposite ends.

These elements are, on the one hand, placed side by side and with an interstitial space between neighboring elements, on the other hand, arranged in a unit that consists of an integral product or at least two sub-units that are placed one on top of another or adjacent to one another, and, finally, connected electrically to one another at each of their opposite ends according to a predetermined serial/parallel assembly scheme, thus forming two opposite electrical connecting faces, for the unit of an integral product or for each sub-unit.

In addition, such a battery unit is ordinarily housed in a casing that is parallelepiped in shape.

One of the major challenges encountered in these batteries, which can be used in polluting and/or damp environments and with high ambient temperatures, consists in responding simultaneously and in a satisfactory manner, on the one hand to the cooling requirements that are necessary because of the significant heating of constituent elements during charging and discharging phases, in particular with high current, on the other hand to the service life and operating safety requirements, in particular of electric insulation, and the absence of oxidation of the connector, and finally to the rigidity and mechanical strength requirements that are necessary for the handling and transport thereof.

A large portion of consumer portable power tools of low voltage (less than 24 volts) have battery units that are inserted into a totally airtight casing, but the charge life of these batteries is nevertheless relatively short. Thus, even in the case of strong current, the battery is discharged before its elements reach critical temperature thresholds, taking into account their insulation in the airtight casing. Actually, even if the temperature of these elements—because of the thermal power dissipated by them and not dissipated quickly in the ambient air—quickly increases, taking into account the total insulation by the airtight casing, these elements finish discharging before attaining a high temperature and cool over time, with the battery then delivering no more current. The operating charge life of such batteries during a discharge with high current is generally only several minutes, and in all cases much less than an hour.

This is not the case of professional applications that require charge lives of more than one hour, and sometimes even several hours, and actually require thermal management of the battery elements during their use. In this latter case, insulation of the battery elements in an airtight shell for working on the outside does not make it possible to deliver high currents in order to prevent too significant a temperature rise in battery elements during the operation of the battery.

Known from the document US 2010/0136413 is an embodiment in which a number of cylindrical battery elements are mounted between two casing parts and then encapsulated by injection of resin or the like.

Although culminating in a rigid and resistant design, this solution limits, and even reduces to zero, the surfaces of cells that are exposed to air circulation, requiring recourse to forced ventilation in the case of significant heating of the elements. In addition, this packaging of the battery elements creates significant extra weight and makes it difficult to dismantle the battery when it is recycled.

The same is true of the designs emerging from the documents WO 2013/139409 and WO 2014/079507, in which the battery units are housed in casings with small aeration openings, requiring a forced air circulation that is accompanied, if necessary, by thermal radiators arranged around the elements.

However, the embodiment of this active cooling function by circulation of forced air consumes a portion of the battery power and consequently reduces its charge life. In addition, the presence of at least one actuator and movable parts entails regular maintenance, a heavier weight, and these batteries cannot be used in damp environments, or in the rain, without running the risk of significant corrosion or short-circuiting at contacts of the battery elements.

Known from the document U.S. Pat. No. 3,219,485 is a portable battery pack that consists of a small number of rechargeable alkaline storage batteries, in which the storage batteries are wedged between two plates that are separated by a perforated wall. The electrical connection of the storage batteries is carried out, on the one hand, at one of their ends mounted in a first perforated plate and, on the other hand, on their lateral sides that are exposed to the circulation of air from the outside. No electrical connection of the terminals of storage batteries embedded in the second non-perforated plate is possible. And finally, taking into account the use of a large number of storage batteries but also their dimensional manufacturing tolerances, it is not possible to achieve sealing between the storage batteries and the perforated plates, ruling out the use of such a battery in rainy weather without risks of corrosion and even electrical short-circuiting, at the electrical connections.

The object of this invention is to overcome at least the primary above-mentioned drawbacks by providing a simple, passive, integrated, reliable, and inexpensive solution, making it possible to ensure effective cooling of a battery device of the type mentioned in the introduction, usable in rainy weather, while also ensuring a proper electrical insulation, a rigid design, good resistance to corrosion, limited extra weight, and facilitating its recycling at the end of its service life.

Known from the document JP-A-2001155702 is a battery device that comprises an overall casing that is essentially parallelepiped in shape, having a height, a width, and a thickness, and a battery unit housed in this casing and that consists of a number of battery elements with elongated airtight bodies, preferably cylindrical in shape, comprising two opposite ends.

The battery elements are, on the one hand placed side by side and with an interstitial space between neighboring elements, on the other hand arranged in a battery unit that consists of an integral product, and, finally, connected electrically to one another at each of their opposite ends according to a predetermined serial/parallel assembly scheme, thus forming two opposite electrical connecting faces for the battery unit.

In addition, this known battery device comprises, at each of the connecting faces of the battery unit, means for compartmentalizing the inner volume of the casing that defines, by cooperation with a continuous wall portion of said casing, airtight housings.

Finally, in this known battery device, at least the zones for electrical connection of the ends of the battery elements open out or are placed in these airtight housings, which contain the electrical connecting means of said elements, and in which the ends of the elements are respectively in supporting engagement on or with opposite end portions of the bodies of the battery elements with the opposite compartmentalization means, with the remaining parts of the bodies of said elements located between said opposite compartmentalization means being exposed directly to the outside environment through perforated or discontinuous wall portions of the casing.

However, the battery device that is known from this document JP is specifically configured to be taken on board a vehicle by being inserted into a corresponding housing.

In addition, the air circulation provided around the elements is efficient only in relation to a system that generates forced air circulation, i.e., that generally uses an active element that has to be powered.

The object of this invention is more specifically to overcome these limitations within the context of batteries mentioned in the introduction.

For this purpose, the invention proposes improving a battery device as mentioned previously by providing that the casing is configured and equipped to make possible the carrying and the transport of said battery device by a user and that said casing comprises two continuous and airtight wall portions that form two opposing side walls that extend essentially into planes defined by the height and the width and constitute the primary faces of the parallelepiped that is formed essentially by the casing, with the perforated wall portions extending peripherally between the two above-mentioned primary wall portions, by connecting them to one another and by defining, for the most part, the thickness, over at least three peripheral sides of said parallelepiped casing, preferably over at least the four peripheral sides of this casing.

The invention will be better understood owing to the description below, which relates to preferred embodiments, provided by way of non-limiting examples and explained with reference to the accompanying diagrammatic drawings, in which.

Figure 1:
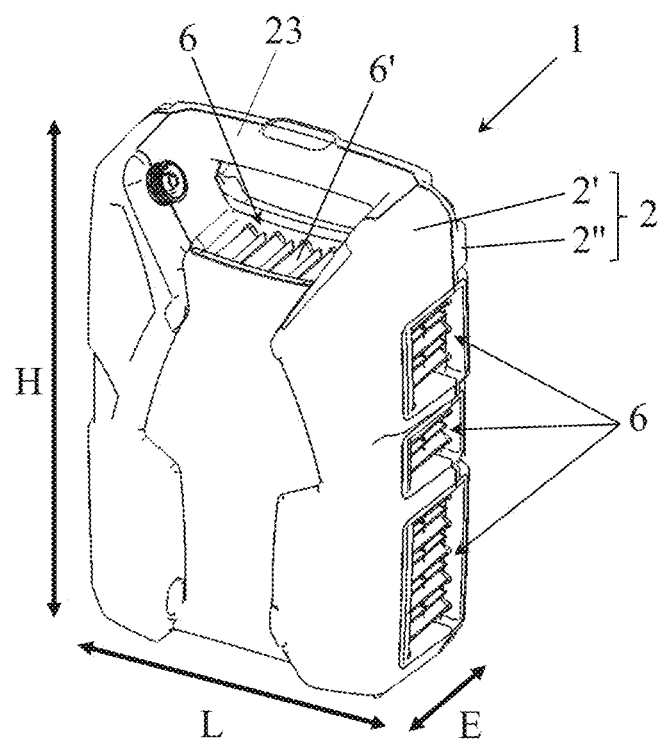
FIGS. 1 and 2 are perspective views in two different directions from a portable battery device according to a first embodiment of the invention, with neither the connecting cable (to the charge to be powered or to the charger) nor the carrying harness (preferably removable) being shown.
Figure 2:
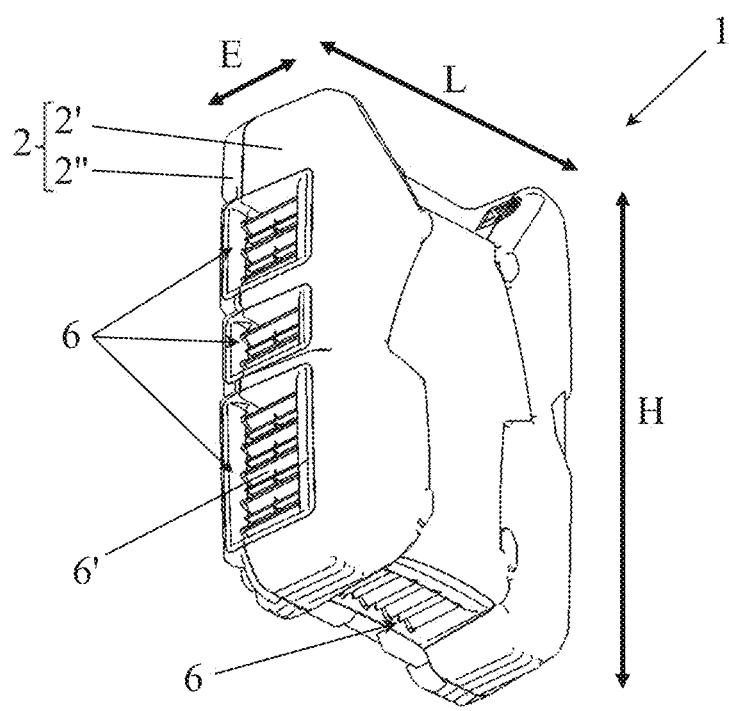
Figure 4:
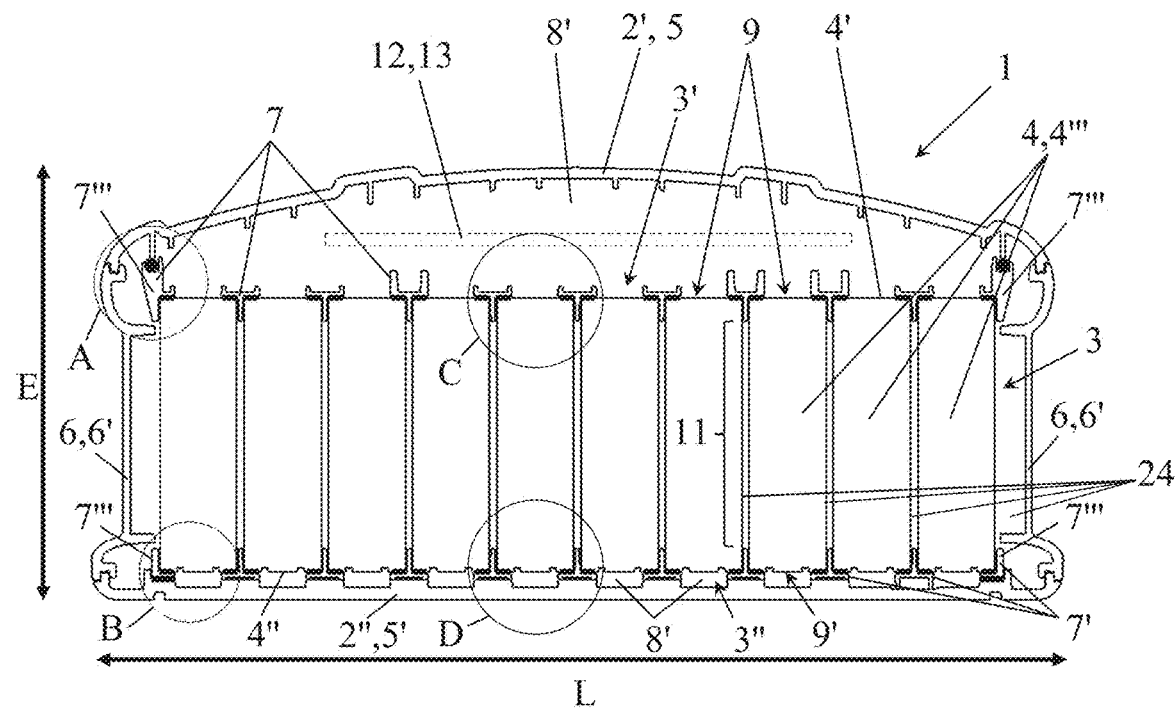
FIG. 4 is a diagrammatic cross-section in a plane that comprises the median planes of a column of battery elements and is perpendicular to the direction H of the device shown in FIGS. 1 and 2, with the electrical connecting means of said elements not being shown.
Figure 5:
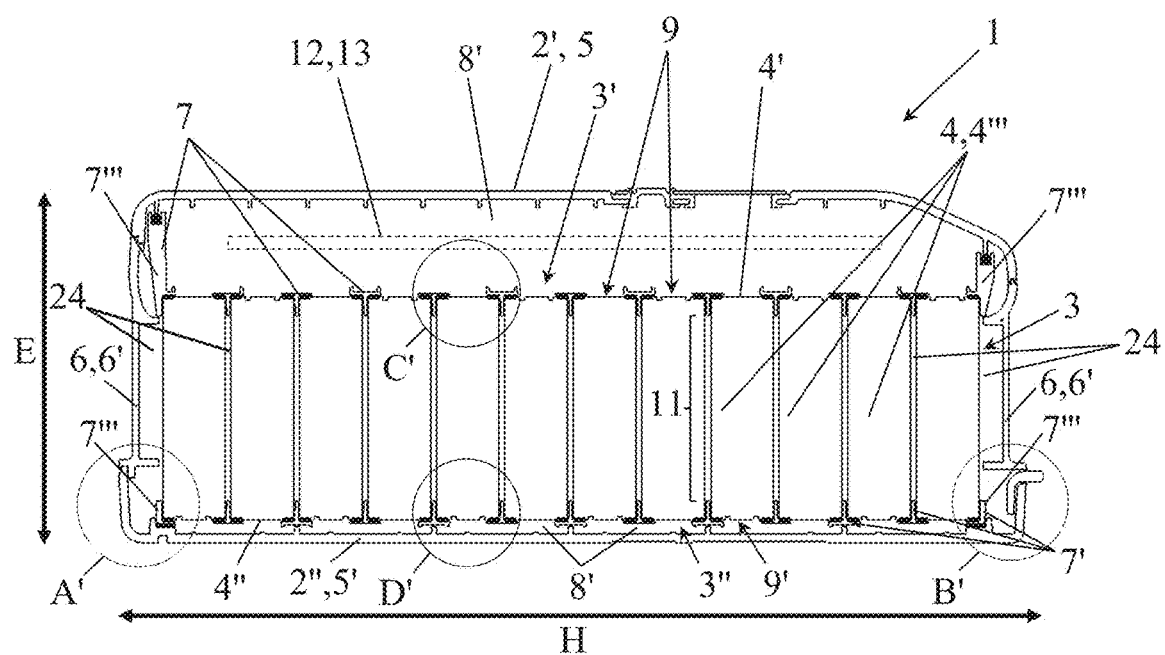
Figure 4A:
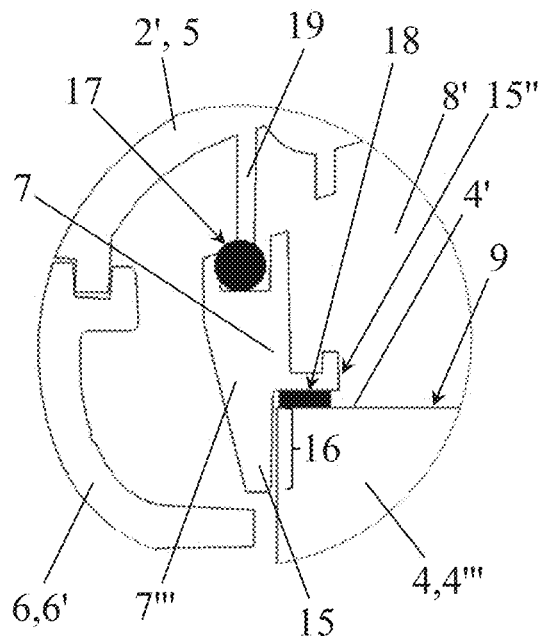
Figure 4B:
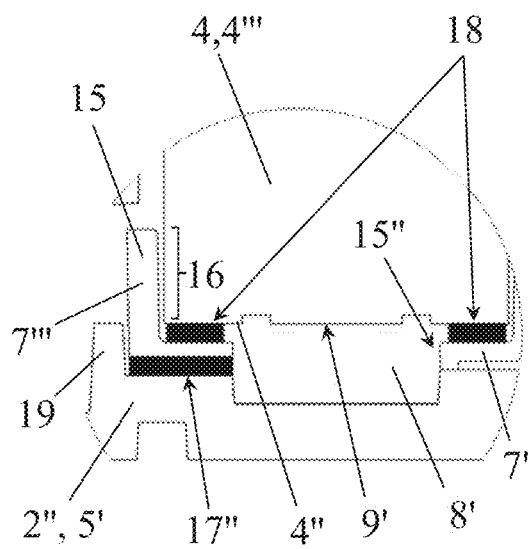
Figure 4C:
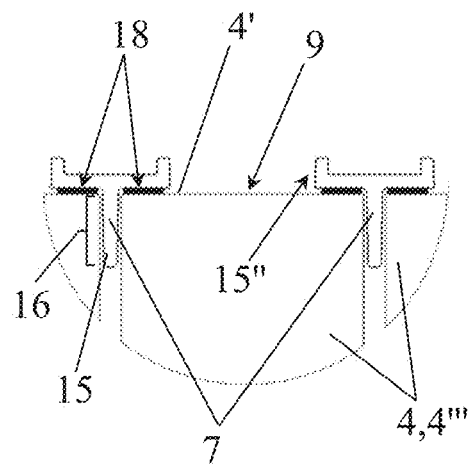
Figure 4D:
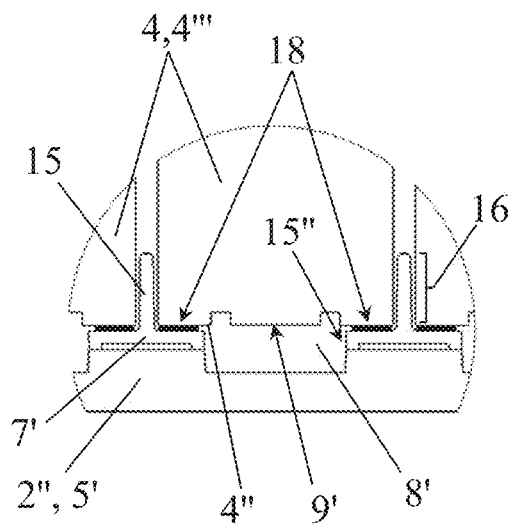
Figure 5A:
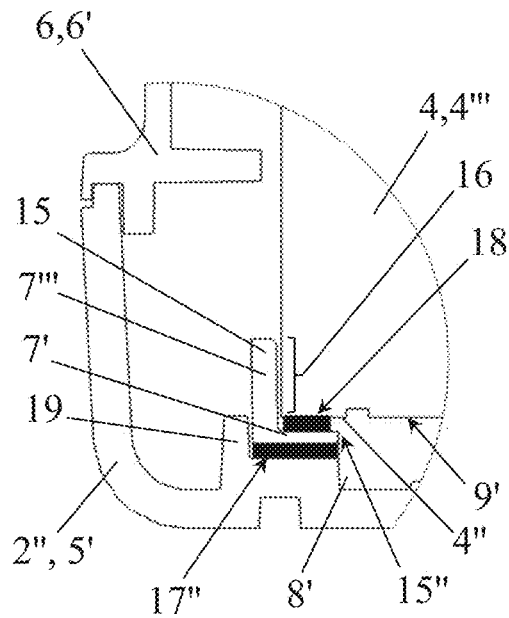
Figure 5B:
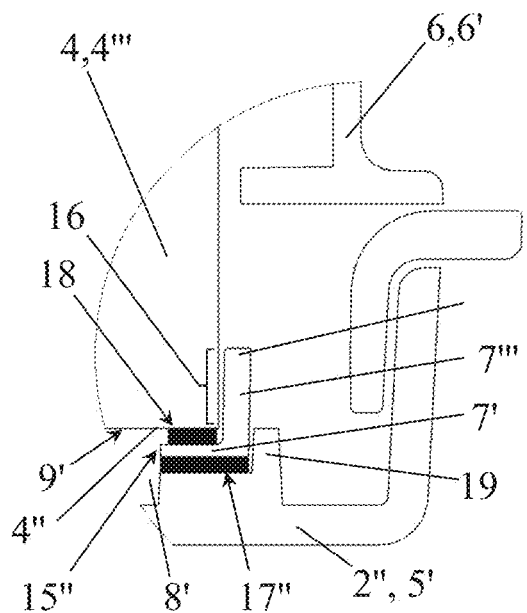
Figure 5C:
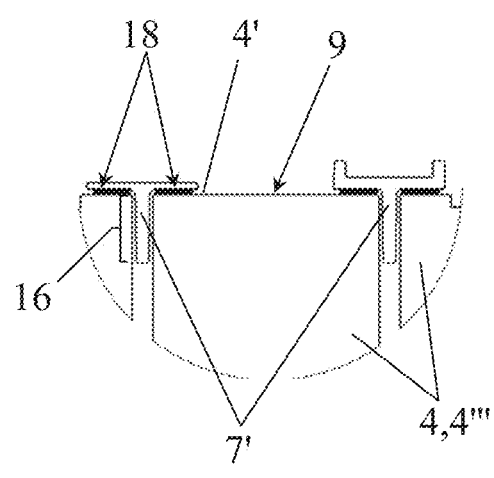
Figure 5D:
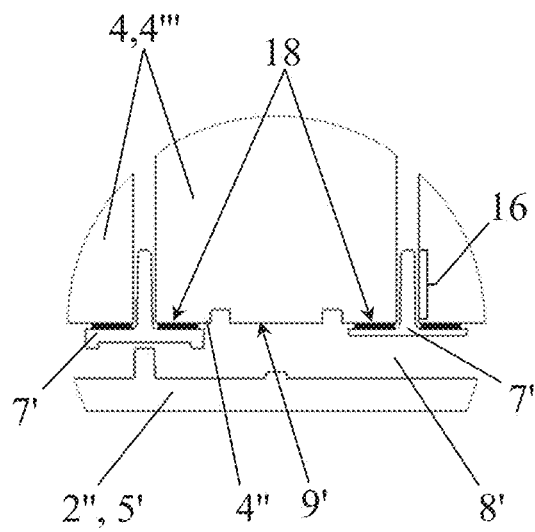
Figure 6:
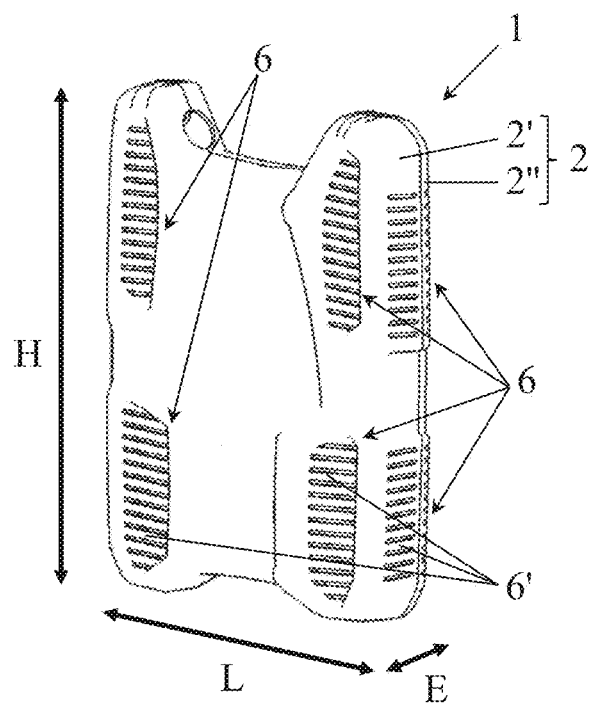
Figure 7:
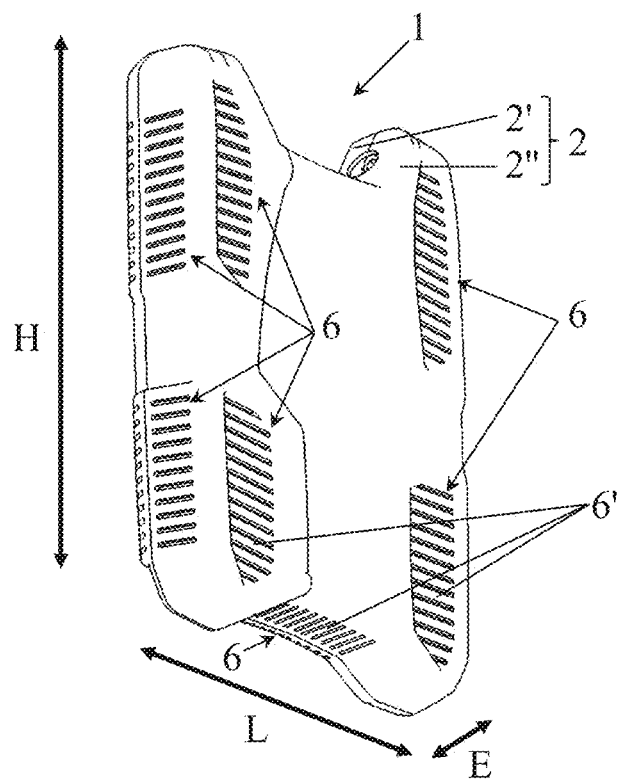
Figure 8:
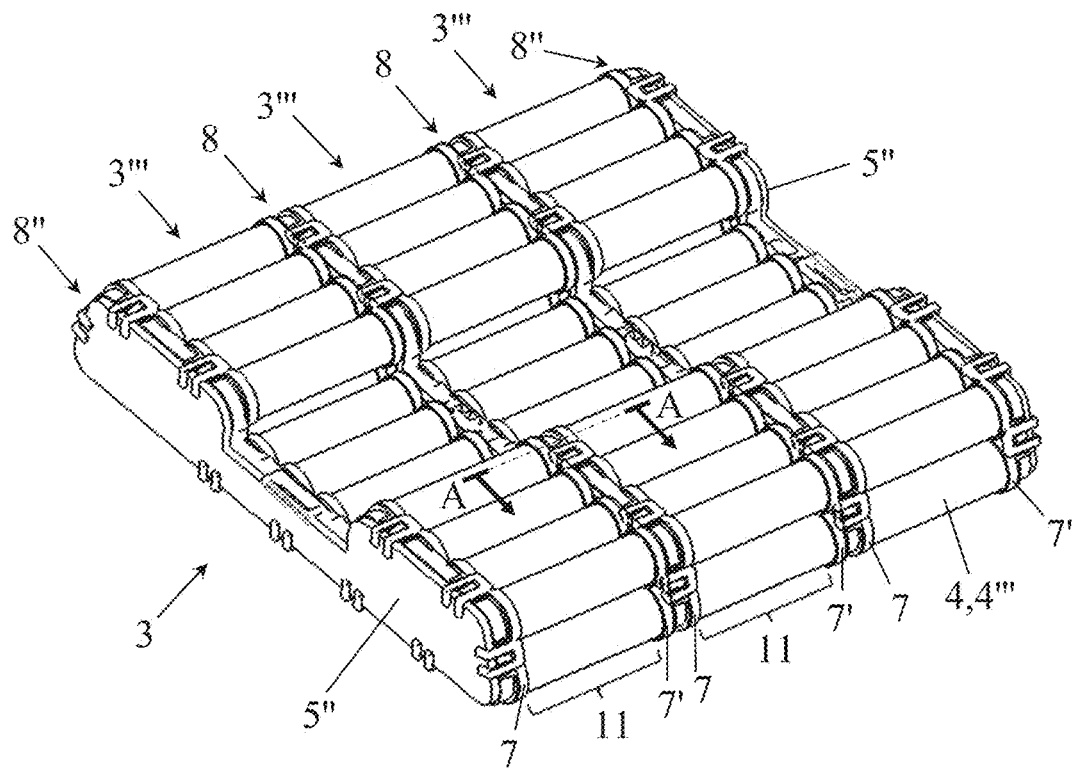
Figure 9:
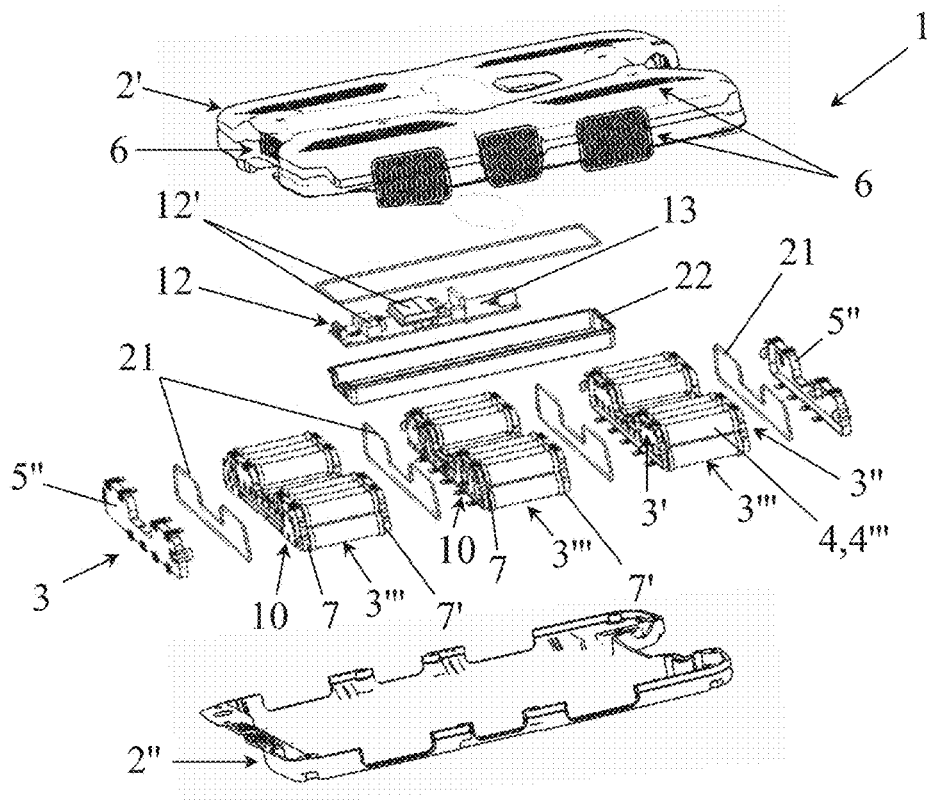
Figure 10A:
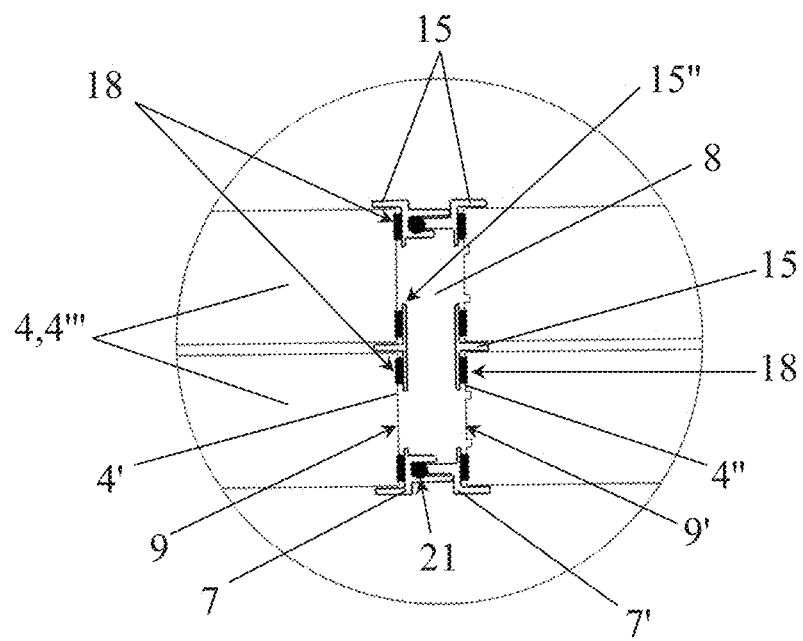
Figure 10B:
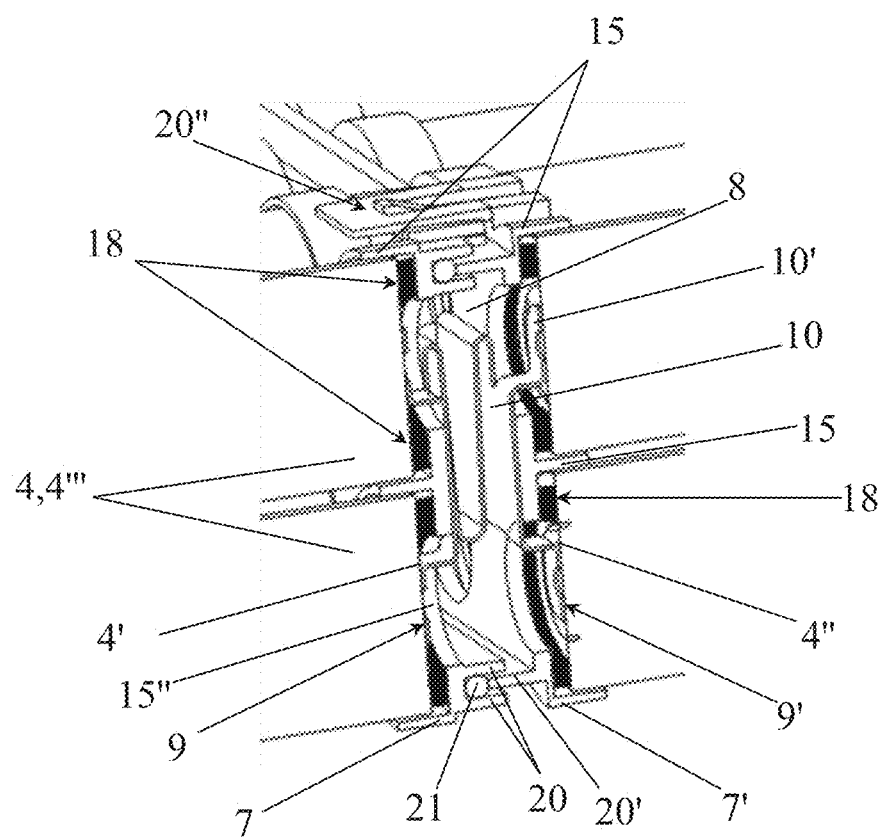
Figure 11:
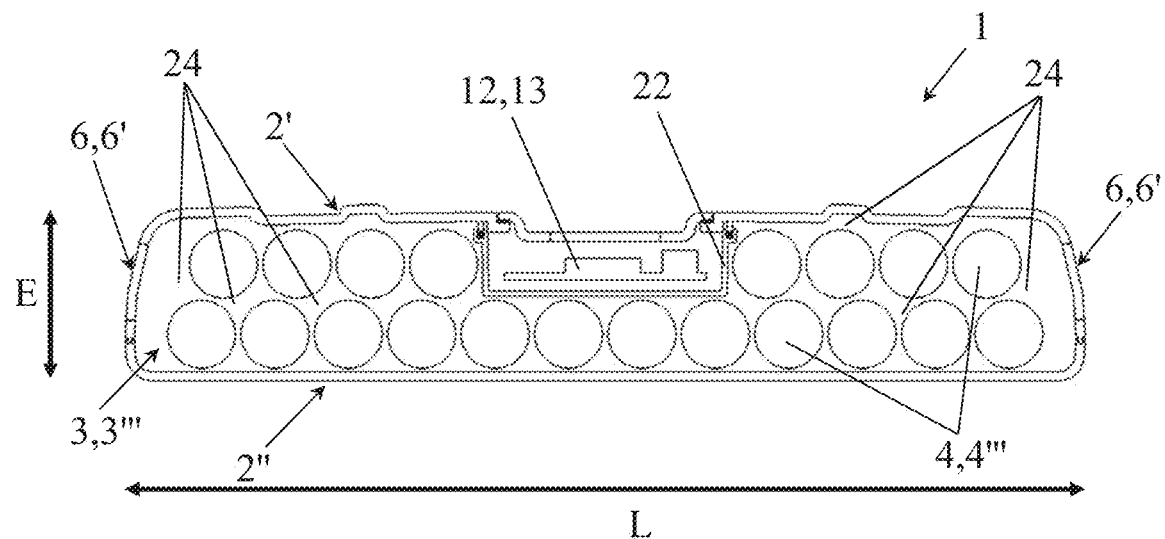
Figure 12:
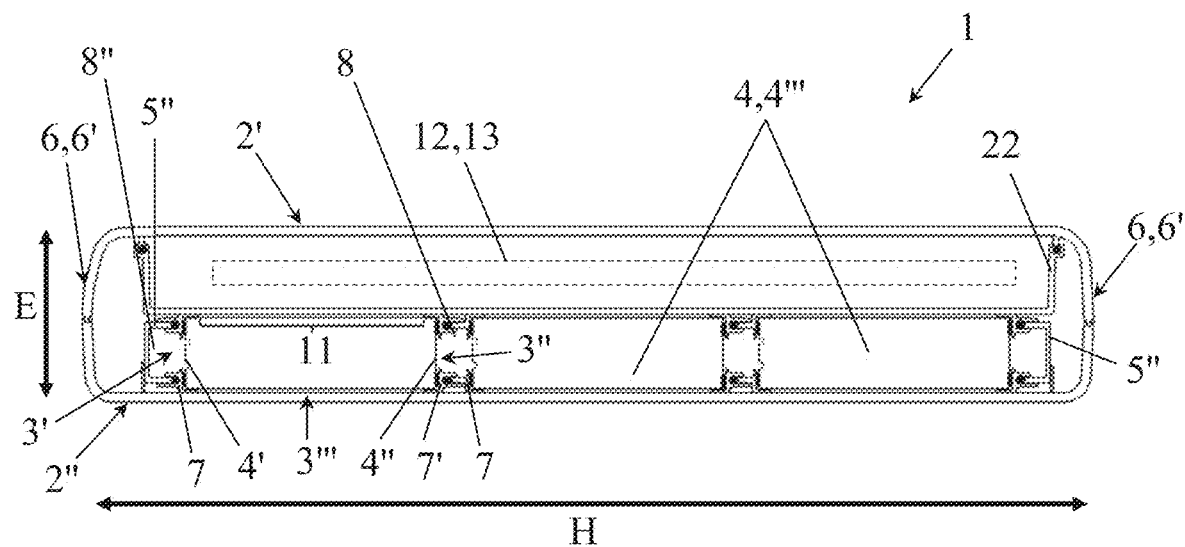
Figure 13:
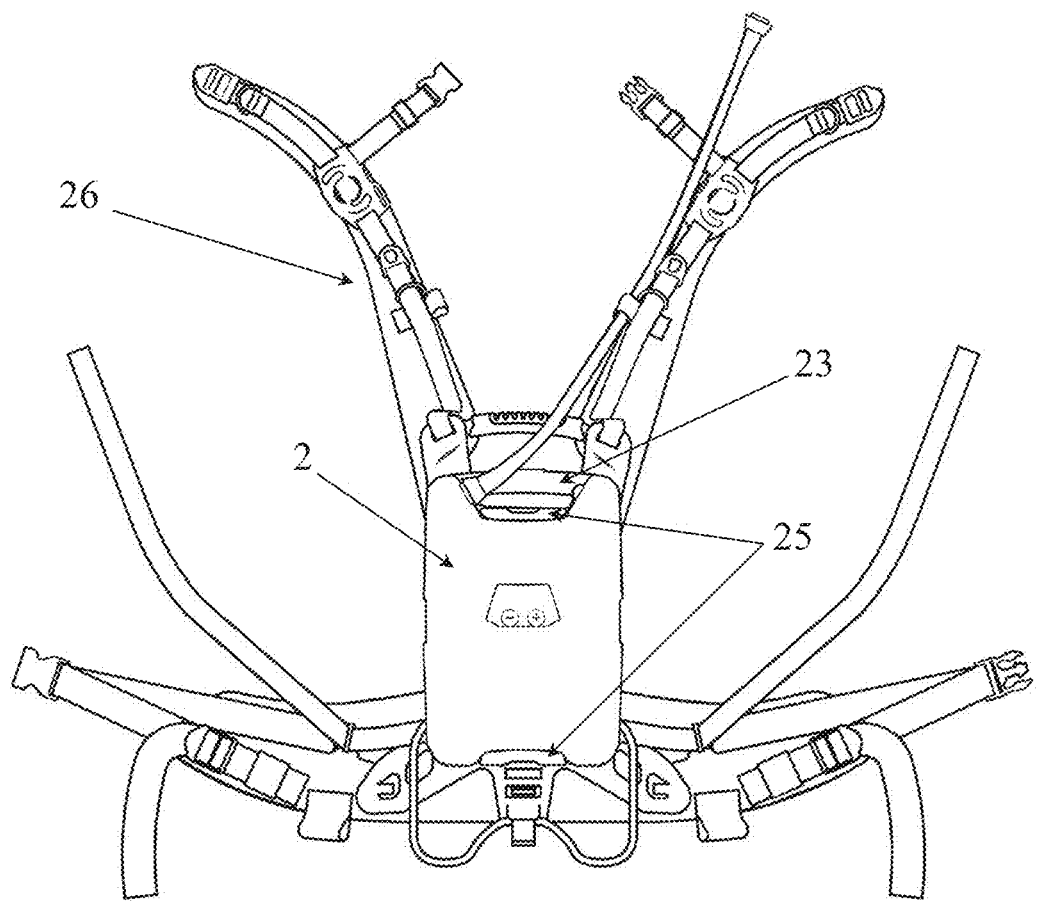

FIGS. 4A, 4B, 4C, and 4D are different-scale views of details A, B, C, and D, respectively, indicated in FIG. 4;

FIG. 5 is a diagrammatic cross-section in a plane that comprises the median planes of a line of battery elements and perpendicular to the direction L of the device that is shown in FIGS. 1 and 2, with the electrical connecting means of said elements not being shown;

FIGS. 5A, 5B, 5C, and 5D are different-scale views of details A', B', C', and D', respectively, indicated in FIG. 5;

FIGS. 6 and 7 are perspective views in two different directions, similar to the views of FIGS. 1 and 2, of a portable battery device according to a second embodiment of the invention, shown with neither connecting cable nor carrying harness;

FIG. 8 is a perspective view of a battery unit (formed from three superposed sub-units) that is part of the device shown in FIGS. 6 and 7 and housed in the casing of the latter;

FIG. 9 is an exploded and perspective view of the battery device shown in FIGS. 6 and 7;

FIG. 10A is a diagrammatic elevation view of the partial cutaway along A-A of FIG. 8', i.e., a cutaway along a plane that comprises the axes of the aligned battery elements of two adjacent sub-units, with the electrical connecting means of the elements not being shown;

FIG. 10B is a perspective view of the cutaway along A-A of FIG. 8, with the electrical connecting means of the battery elements being shown;

FIG. 11 is a diagrammatic cross-section of the battery device that is shown in FIGS. 6 and 7 in a median plane of a battery sub-unit, perpendicular to the axis of the battery elements and to the direction H;

FIG. 12 is a diagrammatic cross-section of the battery device that is shown in FIGS. 6 and 7 in a median plane of the battery device, perpendicular to the direction L and comprising the axes of battery elements of three successive sub-units, and FIG. 13 is a representation of a battery device according to the invention that is equipped with a harness.

FIGS. 1 to 7, 9, 11, and 12 show a portable battery device 1 that comprises a casing 2 that is overall essentially parallelepiped in shape, having a height H, a width L, and a thickness E, and a battery unit 3 that is housed in this casing 2.

The battery unit 3 consists of a number of battery elements 4 with elongated airtight bodies 4''', preferably cylindrical in shape, comprising two opposite ends 4' and 4". The battery elements 4 are preferably Lithium-Ion technology storage batteries in a cylindrical format 18650. Other technologies of storage batteries and of other formats, including non-cylindrical formats, can, of course, be used within the framework of the invention.

These battery elements 4 are on the one hand placed side by side and with an interstitial space between neighboring battery elements 4, on the other hand arranged in a battery unit 3 that consists of an integral product (consistent with a first embodiment of the invention) or of at least two sub-units 3''' (which will be described later in relation to the second embodiment of the invention) that are placed on top of one another or adjacent to one another, and, finally, connected electrically to one another at each of their opposite ends 4' and 4" according to a predetermined serial/parallel assembly scheme, thus forming two opposite electrical connecting faces 3' and 3", for the battery unit 3 of an integral product or for each sub-unit 3'''.

Figure 3:
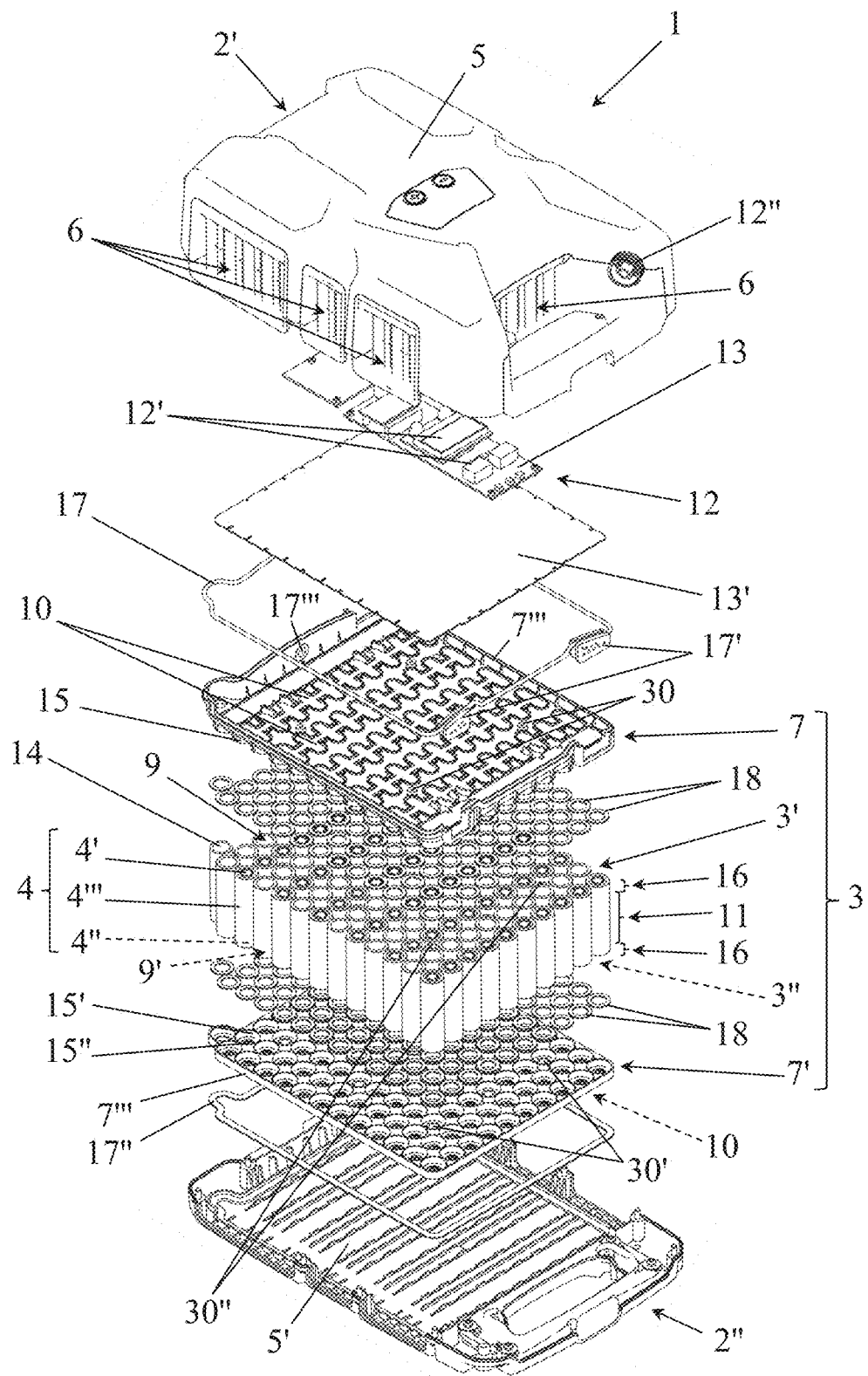
FIG. 3 is an exploded perspective view of the battery device shown in FIGS. 1 and 2.

In the first practical embodiment that corresponds to FIGS. 3 to 5, the battery unit 3 comprises 120 battery elements 4 that are placed side by side along a regular matrix of 10 lines and 12 columns.

In the second practical embodiment that corresponds to FIGS. 8, 9, 11, and 12, the battery unit 3 comprises three sub-units 3''', each comprising 20 battery elements 4 that are placed side by side on two levels.

This battery device 1 comprises, at each of the connecting faces 3', 3" of the battery unit 3 of an integral product or of each sub-unit 3''', surface means 7, 7' for compartmentalizing the inner volume of the casing 2 that defines—with one from among a compartmentalizing means 7', 7, a continuous wall portion 5, 5' of said casing 2, and a separate continuous wall 5'''—airtight housings 8, 8', 8''. At least the zones 9, 9' for electrical connection of the ends 4', 4'' of the battery elements 4 open into or are placed in these airtight housings 8, 8', 8'', and these airtight housings 8, 8', 8'' contain the means 10 for electrical connection of said battery elements 4.

These electrical connecting means 10 are preferably means for connecting without welding, such as metal contact loops 10' that are held by an elastic return force or a magnetic force on the connecting zones 9, 9' of the ends 4', 4'' of the elements 4. Nevertheless, welded contacts can also be envisaged.

In addition, the ends 4', 4'' of the battery elements 4 are respectively in supporting engagement, by or with opposite end portions 16 of the body 4''', with the opposite compartmentalization means 7, 7', and the remaining parts 11 of the bodies 4''' of the battery elements 4 located between said opposite compartmentalization means 7, 7' are exposed directly to the outside environment through perforated or discontinuous wall portions 6 of the casing 2.

In accordance with the invention, the casing 2 is configured and equipped to make possible the carrying and the transport of said battery device 1 by a user and in that said casing 2 comprises two wall portions 5, 5' that are continuous and airtight and that form two opposing side walls that extend essentially in planes defined by the height H and the width L and constitute the primary faces of the parallelepiped formed essentially by the casing 2, with the perforated wall portions 6 extending peripherally between the two above-mentioned primary wall portions 5 and 5', by connecting them to one another and by defining for the most part the thickness E, on at least three peripheral sides of said parallelepiped casing 2, preferably on at least the four peripheral sides of this casing 2.

Owing to all of the above-mentioned structural arrangements, the invention provides a battery device 1, in which the body 4''' of each battery element 4 is exposed for the most part, and even nearly in its entirety, to the outside air, promoting an optimal heat exchange with the latter, whereas electrical connections are made with two opposite ends 4' and 4'' of the battery elements 4, by being placed in isolated and airtight housings 8, 8', and 8''. This sealing of the housings 8, 8', 8'' is configured to allow, on the one hand, the balance of pressures of the housings 8, 8', 8'' with the outside atmospheric pressure in the casing 2, and, on the other hand, the evacuation toward the outside of a possible inner moisture to prevent condensation of the latter. Such a sealing by internal compartmentalization and with controlled exchange with the exterior makes it possible to increase the service life of the battery device 1 by considerably limiting the corrosion in the area of the electrical connections as well as the risks of short-circuiting in these same connections, while allowing usage of said battery device 1 on the exterior, including in rainy weather. Preferably each of the compartmentalization means 7, 7' can comprise for this purpose at least one small opening 17''' that is covered by, for example, a textile membrane that is water-repellent or impermeable to liquids.

By providing perforated wall portions 6' on at least the four small peripheral sides of the parallelepiped that is formed by the casing 2, it is possible to optimize the air circulation in the inner volume 24 and between the battery elements 4 by providing opportunities for transfer of air, at the intake and at the exit, which are distributed circumferentially in relation to the casing 2 and located in the area of the outside surfaces that are normally released during the transport of the casing 2 (equally good ratio: effectiveness of cooling/area of perforated zones).

The openings (preferably in the form of slots) of the peripheral side perforated wall portions 6' are directly in contact with the ambient air and promote air circulation by the convection effect around and between the exposed parts 11 of the elements 4, without implementing any active system of forced circulation. Thus, the heat also is actually evacuated into the ambient air through these same openings (some of the openings capture ambient air and force it into the inner volume 24, whereas the other openings expel it in the form of hotter air).

By simultaneously ensuring the function of support and maintenance of the battery elements 4 and a sealing function at their ends 4', 4'', the compartmentalization means 7 and 7' make it possible to limit the weight of the battery device 1.

Moreover, in addition to the rigidity provided by the structural and mechanically resistant arrangement formed by the plates 7, 7' and the parts 2', 2'', the invention advantageously uses the cumulative rigidity of the bodies 4''' of the elements 4 that are all oriented, in a single unit or by sub-units 3''', in the same direction in a parallel arrangement. The provision of a design element for stiffening in this direction, at least in the extension of the parts 11 of the bodies 4''', is therefore reduced, and even superfluous (simpler structure, lower weight). FIG. 3 also shows an example of means for mechanical assembly of the battery unit 3 at the compartmentalization means 7 and 7' by the use of projections 30, 30' that are integrated into the compartmentalization means and accommodating posts 30'' that are assembled with them via screws, not shown, with these posts 30'' being distributed in the battery unit 3 from among the elements 4 and forming rigid spacers between the means 7, 7'. Sealing can be provided at the projections 30, 30' so as to prevent the possible migration of moisture into the housings 8, 8', and 8'' by these mechanical assembly means. The use of these assembly means 30, 30', 30'' facilitates the manipulation of the battery unit 3 when it is mounted, for its handling or its control, before the final assembly of the battery device 1. The battery elements 4 can, of course, be mounted in the same direction or in an alternately inverted manner, in such a way as to establish the characteristics of voltage and capacity of the battery device 1 by a suitable configuration of serial/parallel connections of the battery elements 4 and mutual electrical connecting means 10.

Advantageously, the compartmentalization means 7, 7' comprise reliefs 15 or recesses 15' and cut-outs 15'' that form a pattern of receiving sites that determines the spaced arrangement of battery elements 4 and that contributes to their lateral support and their longitudinal wedging, by coming into supporting engagement with the end portions 16 of these battery elements 4.

Consistent with a simple and preferred design variant of the invention, emerging from FIGS. 3, 4, 5, 9, 10A, 10B, and 12 in particular, the compartmentalization means 7, 7' each consist of a perforated plate, having cut-outs 15'' that coincide with the ends 4', 4'' of the different battery elements 4 and each defining an access path between the interior of the adjoining housing 8, 8', 8'' and the electrical connecting zone 9, 9' at least of the corresponding ends 4', 4'' of the battery elements 4, with these cut-outs 15'' advantageously being located at the bottom of the recesses 15' of the plate 7, 7' in question or surrounded by annular reliefs 15 that receive the end portions 16 of the bodies 4''' of the battery elements 4.

Preferably, and as FIGS. 4, 5, 10A, 10B, and 12 show, the connecting zones 9, 9' are, in relation to the inside volumes of the airtight housings 8, 8', 8", located set back or at most in a flush manner in the cut-outs 15".

According to a first design alternative, it can be provided that the perforated plates 7, 7' that form compartmentalization means each extend from an integral product and at a distance above the ends 4', 4" of the cylindrical bodies 4''' of the battery elements 4.

According to a second design alternative, it can be provided that the perforated plates 7, 7', preferably each from an integral product and forming compartmentalization means, are fitted onto the opposite ends 4' and 4" of the cylindrical bodies 4''' of the battery elements 4 at their end portions 16.

Moreover, these perforated plates 7, 7', which receive the opposite ends 4', 4" of the battery elements 4 for supporting them and holding them rigidly in position in the casing 2 and for insulating these ends 4', 4" in an airtight manner in relation to the inner volume 24 of the casing 2 in communication with the outside environment, are wedged in the constituent parts 2', 2" of the rigid, protective, and carrying casing 2, covering the battery unit 3 in its entirety. The parts 2' and 2" advantageously come in the form of two complementary hollow half-shells.

In accordance with a characteristic of the invention, each perforated plate 7, 7' comprises a peripheral edge 7''', 20, 20' that works by mechanical engagement either with a peripheral edge 20', 20 of another perforated plate 7', 7 that is placed opposite, or with an inner formation 19 of one of the continuous wall portions 5, 5', 5", with insertion of a suitable sealing means 17, 17", 21 and by wedging between the two components 7, 7', 5, 5' that work together.

Advantageously, and as FIGS. 3 to 5 show, for example, at least one 8' of the airtight housings 8, 8', 8"—optionally of greater volume—contains means 12 for electrical connection of the battery unit 3 to a connector 12" that is mounted in the casing 2 and that makes it possible to connect to one or more outside charging or discharging device(s), as well as optionally electronic means 12' for management and control of the battery unit 3, if necessary grouped on at least one card 13. An insulation plate 13', shown in FIG. 3, consisting of, for example, a thin rigid insulation layer made of plastic material, makes possible electrical insulation between the electrical connecting means 12 and the electrical connecting means 10 of the elements 4. The electrical cables connecting the connector 12" to the electrical connecting means 12 can pass through the airtight housing 8' via packing glands 17' that are associated with, for example, compartmentalization means 7.

In the embodiment of FIGS. 9, 11, and 12, at least one of the airtight housings 8, 8" is connected to an additional compartment 22 that contains in an airtight way the means 12 for electrical connection of the battery unit 3.

To connect internally the polar regions that pick up the connections that are obtained from opposite faces 3' and 3", i.e., without requiring an outside connecting means, it can advantageously be provided, as FIG. 3 shows, for example, that the battery unit 3 of an integral product or each sub-unit 3' integrates, instead of a battery element 4 in the arrangement of battery elements 4, a pipe 14 of the same dimensions as such a battery element 4 and mounted in a rigid and airtight manner, like the battery elements 4 between the two compartmentalization means 7 and 7' in plate form, making possible the passage of electrical connecting lines between the airtight housings 8, 8', 8".

This connecting pipe 14, which forms an artificial battery element 4, is produced in such a way as to work with the sealing means 18 of the battery elements 4.

In addition to the fact of procuring an airtight and protected passage with the electrical connecting lines in the inner space of the battery exposed to the outside environment, the pipe 14, because of its shape, its dimensions, and its arrangement, disrupts neither the arrangement of the battery elements 4 nor the air circulation between the latter. This pipe 14 can, in addition, serve as a brace between the two plates 7 and 7'.

As, for example, FIGS. 1, 2, 6, and 7 show, the casing 2 comprises two continuous and airtight wall portions 5, 5' that are opposite one another and connected to one another by wall portions 6 that are at least partially perforated or discontinuous, with each wall portion 5, 5' belonging to a constituent part 2', 2" of the casing 2 and the perforated wall portions 6 advantageously being interlocked by fitting between the two constituent parts 2', 2" or being integrated with the latter.

One 2' of the parts 2', 2" can have a shell shape, partially bent, to constitute the housing 8' of larger volume and the other 2" a flatter shape.

So as to ensure an effective cooling, without implementing an active circulation means, the perforated wall portions 6 can comprise structures 6' promoting the circulation of passing air and simultaneously forming a barrier against the insertion of solid bodies (such as, for example, leaves or gravel) from the outside into the casing 2, such as, for example, slots or flanges with aerodynamic profiles, optionally mounted in aeration openings made in said wall portions 6. The latter can advantageously have structures in the form of louvers with inclined blades 6' in the manner of sound deflectors. Resistance to the circulation of air through the casing 2 is thus reduced, and the heating of battery elements 4 accentuates—by convection effect—this circulation of air, actually accelerating the cooling of the battery elements 4.

The location of the perforated wall portions 6 on the casing 2 is determined in such a way that the circulation of air by natural convection between the battery elements 4 in the inner volume that is delimited by the two compartmentalization walls 7 and 7' is promoted with the device 1 in particular in the normal position of charging or use (transport).

The constituent parts 2' and 2" of the casing (assembled by, for example, screwing, gluing, or by elastic interlocking or catch interlocking) as well as the compartmentalization walls 7 and 7' are preferably produced by molding or thermoforming of a thermoplastic material.

In accordance with a first embodiment, illustrated in FIGS. 1 to 5, it is advantageously provided that when the battery unit 3 is an integral product or one piece, the battery elements 4 are placed longitudinally in the direction of the thickness E and perpendicular to the two primary faces of the rectangular parallelepiped formed by the casing 2.

In this first embodiment, the battery device 1 can comprise, on the one hand, continuous peripheral sealing means 17, 17" between the compartmentalization means 7, 7' and the continuous wall portions 5, 5' of the casing 2, and, on the other hand, individual sealing means 18 between the ends 4', 4" of each of the battery elements 4 and the compartmentalization means 7, 7', either at the ends 4', 4" of the cylindrical bodies 4''' of the battery elements 4, or at the lateral face of end portions 16 of said cylindrical bodies, set back in relation to said ends 4', 4".

As FIGS. 4A to 4D and 5A to 5D show, the invention can propose, for example, that the compartmentalization means 7, 7' consist of plates that are provided with cut-outs 15", each surrounded by an annular relief 15 that receives the end portion 16 of a battery element 4, and that a circumferential sealing means 18 between the perforated plate 7, 7' in question and the end 4', 4" of the battery element 4 in question is present at each cut-out 15", with said plates 7, 7' resting against and/or on said end portions 16, with insertion of said sealing means 18.

The sealing means 18 can consist of, for example, flexible washers, as shown, O-ring seals, or lips associated with baffles.

The sealing means 18 are preferably made of an insulating and flexible material such as a closed-cell expanded polyethylene plastic, on the one hand to ensure sealing between the end portions 16 of the battery elements 4 and the compartmentalization means 7, 7', and on the other hand to compensate for the dimensional manufacturing tolerances of the elements 4, which differ from one manufacturing batch to another or from one battery elements manufacturer to the next, when the battery is assembled. These means also make it possible to dampen—in the area of elements 4—possible shocks that the battery device 1 may experience during its life cycle and its uses. They can also consist of a flexible glue strip. It is also possible that the sealing means 18 are covered by a double-surface adhesive strip in order to adhere, on the one hand, to a surface of one of the compartmentalization means 7, 7', and, on the other hand, to the end portions 16 of the battery elements 4. Thus assembled, if necessary the battery unit 3 does not require additional mechanical assembly means, thus reducing the weight of the battery unit 3.

The flexibility of the sealing means 18 also makes it possible to preserve sufficient sealing in the event of thermal expansion associated with intense use of the battery over a significant period and/or with extreme ambient temperature conditions.

For the purpose of creating airtight housings 8, 8', and 8", it can be provided that each compartmentalization means 7, 7' in the form of a perforated plate be received by cooperating and wedged engagement of its peripheral edge 7''' and with insertion of a sealing means 17, 17" into, against, or on a continuous inner formation 19 of the corresponding continuous or airtight wall portion 5, 5' of the casing 2, with this formation consisting of, for example, a shoulder, a flange, a wing, a rib, a groove, or the like.

In accordance with a second embodiment, and as illustrated in FIGS. 6 to 12, when the battery unit 3 consists of the mechanical and electrical association of at least two sub-units 3''', each sub-unit 3''' comprises at least one row, preferably at least two rows that are arranged in parallel layers of battery elements 4, all oriented longitudinally in the direction of the height H or the width L of the rectangular parallelepiped that is essentially formed by the casing 2 and placed parallel to the primary faces of the latter, with said sub-units 3''' being either placed on top of one another like stages of battery elements 4 in the direction of the height H, or adjacent to one another laterally in the direction of the width L, preferably with constitution and insertion of an intermediate airtight housing 8 between two adjacent sub-units 3''', with an end airtight housing 8" advantageously being present at each of the opposite ends of the battery unit 3.

The above-mentioned figures also show that each intermediate airtight housing 8 consists of two compartmentalization means 7 and 7' in the form of plates equipped with peripheral edges 20, 20' that coincide and work together by airtight assembly, in the manner of two complementary shells, with the battery unit 3 comprising at least one interstitial airtight lodging 8 located between two sub-units 3''' and two end housings 8" located at two opposite longitudinal ends of the battery unit 3.

Each end housing 8" is, for example, formed by a compartmentalization means 7, 7' that is mounted on the elements 4 of the end sub-unit 3" engaging with a continuous wall 5'''.

Preferably, the edge 20 of one 7 of the two compartmentalization plates 7, 7' of each intermediate airtight housing 8 has a groove or undercut structure, and the edge 20' of the other one 7' of the two compartmentalization plates has a structure with at least one rib or wing, able and designed to be fitted into said groove or undercut in such a way as to create a baffle between the two assembled edges 20 and 20', with a seal 21 being present in said groove 20 or on said rib 20'.

In an advantageous manner, the assembly by fitting in the area of the edges 20, 20' of two compartmentalization plates 7 and 7' is locked by elastic snapping-on of cooperating supplementary means 20" of the catch/notch type.

In the embodiment that is shown in FIGS. 6 to 12, the battery device 1, and more specifically the battery unit 3 that is formed by several sub-units 3''', comprises, on the one hand, interstitial or intermediate airtight housings 8, located between two sub-units 3''' of battery elements 4 that are placed one on top of another or adjacent and that house the interconnecting means 10 of the accessible electrical connecting zones 9, 9' of the battery elements 4 of the two sub-units 3''' in question, and, on the other hand, end or terminal airtight housings 8", located at the lower or upper edge or a lateral edge of an arrangement of sub-units 3''' that are placed one on top of another or adjacent to one another, and of which one of the outer-compartmentalization plates among 7 and 7' has no cutout 15" and constitutes a continuous wall 5'''.

Within the framework of the second embodiment and taking into account the arrangement of the battery elements 4 in the casing 2, the perforated wall portions 6 can also extend, in addition from the four lateral sides (small sides of the parallelepiped) of the casing 2, at the primary faces of the latter (defined by the dimensions H and L), i.e., in the primary wall portions 5 and/or 5' that nevertheless remain continuous for the most part, in particular at their respective central regions (see FIGS. 6 and 7).

As indicated above and for the purpose of transporting the battery device 1 while in use, the latter can also comprise a rigid harness 26 that is added by hooking with releasable locking to the casing 2, at the hooking points 25 of the latter (FIG. 13).

Preferably, the battery elements 4 are of the lithium-ion or polymer lithium type, and the casing 2 and the compartmentalization means 7, 7' are made of a thermoplastic material, with at least the layer of outside material of the battery elements 4 being of a type that is resistant to attacks from the surrounding environment.

A carrying handle 23 (cf. FIG. 1) can be integrated with one of the two parts 2', 2" of the casing 2 or consist of the assembly of the two parts 2', 2" (with the parts 2', 2" integrating mutually complementary portions of this handle).

The invention also relates, although not shown, to a portable electric power tool set comprising at least two components that are connected by a cable, namely a tool that integrates at least one actuator and an autonomous power supply in the form of a battery device. This set is characterized in that the battery device is a battery device 1 as described above.

This set can also comprise a charger, also able to be connected to the battery device 1, alternately with the tool.

Of course, the invention is not limited to the embodiments that are described and shown in the accompanying drawings. Modification are possible, in particular from the standpoint of the composition of the various elements or by substitution of technical equivalents, without thereby exceeding the scope of protection of the invention.

The invention claimed is:

1. Portable battery device (1) that comprises a casing (2) that is overall essentially parallelepiped in shape, having a height (H), a width (L), and a thickness (E), and a battery unit (3) that is housed in the latter,
    with the battery unit (3) consisting of a number of battery elements (4) with elongated airtight bodies (4'''), comprising two opposite ends (4' and 4"),
    with the battery elements (4) being placed side by side and with an interstitial space between neighboring elements (4), and also arranged in a battery unit (3) that consists of an integral product or of at least two sub-units (3''') that are placed on top of one another or adjacent to one another, and, finally, connected electrically to one another at each of their opposite ends (4', 4") according to a predetermined serial/parallel assembly scheme, thus forming two opposite electrical connecting faces (3', 3"), for the battery unit (3) of an integral product or for each sub-unit (3'''),
    with this battery device (1) comprising—at each of the connecting faces (3, 3') of the battery unit (3) of an integral product or of each sub-unit (3''')—surface means (7, 7') for compartmentalizing the inner volume of the casing (2) that defines—by working with one from among: i) a continuous wall portion (5, 5') of said casing (2), ii) another compartmentalization means (7', 7), and iii) a separate continuous wall (5")—airtight housings (8, 8', 8"),
    battery device (1), in which at least zones (9, 9') for electrical connection of the ends (4', 4") of the battery elements (4) open into or are placed in these airtight housings (8, 8', 8"), which contain the means (10) for electrical connection of said elements (4), and in which the ends (4', 4") of the elements (4) are respectively in supporting engagement on or with opposite end portions (16) of the bodies (4''') of the battery elements (4) with the opposite compartmentalization means (7, 7'), with the remaining parts (11) of the bodies (4''') of said elements (4) located between said opposite compartmentalization means (7, 7') being exposed directly to the outside environment through perforated or discontinuous wall portions (6) of the casing (2),
    device (1), wherein the casing (2), forming a cover in relation to the outside environment, is configured and equipped with means to make possible, while in use, the carrying and the transport of said battery device (1) by a user, namely a harness (26) and a handle (23), wherein said casing (2) comprises two continuous and airtight wall portions (5, 5') that form two opposing side walls that extend essentially into planes defined by the height (H) and the width (L) and constitute the primary faces of the parallelepiped that is formed essentially by the casing (2), wherein the perforated wall portions (6) extend peripherally between the two above-mentioned primary wall portions (5 and 5'), by connecting them to one another and by defining for the most part the thickness (E), over at least three peripheral sides of said parallelepiped casing (2), with said perforated wall portions (6) being located at outside surfaces that are normally released when the casing (2) is transported, and wherein the perforated wall portions (6) comprise structures (6') that promote the circulation of passing air and that simultaneously form a barrier against the insertion of solid bodies from the outside into the casing (2).

2. Battery device according to claim 1, wherein the compartmentalization means (7, 7') comprise reliefs or recesses (15') (15) and cut-outs (15") that form a pattern of receiving sites that determines the spaced arrangement of the elements (4) and that ensures their lateral support and their longitudinal wedging, by engaging with at least the end portions (16) of these elements (4).

3. Battery device according to claim 1, wherein the compartmentalization means (7, 7') each consist of a perforated plate, having cut-outs (15') that coincide with the ends (4', 4") of the different battery elements (4) and that each define an access path between the interior of the adjoining housing (8, 8', 8") and the electrical connecting zone (9, 9') at least of the corresponding ends (4', 4") of the battery elements (4), with these cut-outs (15") advantageously being located at the bottom of the recesses (15') of the plate (7, 7') in question or surrounded by annular reliefs (15') that receive the end portions (16) of the bodies (4''') of the battery elements (4).

4. Battery device according to claim 3, wherein the perforated plates (7, 7') that form compartmentalization means each extend from an integral product and at a distance above the ends (4', 4") of the cylindrical bodies (4''') of the battery elements (4), and wherein these perforated plates (7, 7')—which receive the opposite ends (4', 4") of the battery elements (4) to support them and to keep them rigidly in position in the casing (2) and to insulate in an airtight manner these ends (4', 4") in relation to the inner volume (24) of the casing (2) in communication with the outside environment—are wedged into the constituent parts (2', 2") of the rigid, protective, and carrying casing (2), covering the battery unit (3) in its entirety.

5. Battery device according to claim 3, wherein the perforated plates (7, 7') that form compartmentalization means are fitted onto the opposite ends (4' and 4") of the cylindrical bodies (4''') of the elements (4) at their end portions (16), and wherein these perforated plates (7, 7')—which receive the opposite ends (4', 4") of the battery elements (4) to support them and to keep them rigidly in position in the casing (2) and to insulate these ends (4', 4") in an airtight manner in relation to the inner volume (24) of the casing (2) in communication with the outside environment—are wedged into the constituent parts (2', 2") of the rigid, protective, and carrying casing (2), covering the battery unit (3) in its entirety.

6. Battery device according to claim 3, wherein each perforated plate (7, 7') comprises a peripheral edge (7'''; 20, 20') that works by mechanical engagement either with a peripheral edge (20', 20) of another perforated plate (7', 7) placed opposite, or with an inner formation (19) of one of the continuous wall portions (5, 5'; 5"), with insertion of a suitable sealing means (17, 17"; 21) and by wedging between the two components (7, 7', 5, 5', 5") that work together.

7. Battery device according to claim 1, wherein at least one (8) of the airtight housings (8, 8', 8") contains means (12) for electrical connection of the battery unit (3) to a connector (12") that is mounted in the casing (2) and that makes possible a connection to one or more outside charging or discharging device(s).

8. Battery device according to claim 1, wherein the battery unit (3) of an integral product or each sub-unit (3''') integrates—instead of a battery element (4) in the arrangement of battery elements (4)—a pipe (14) of the same dimensions as such a battery element (4) and mounted in a rigid and airtight manner, like the battery elements (4) between the two compartmentalization means (7 and 7') in plate form, making possible the passage of electrical connecting lines between the airtight housings (8, 8', 8'').

9. Battery device according to claim 1, wherein the two continuous and airtight wall portions (5, 5'), opposite to one another and connected to one another by wall portions (6) that are at least partially perforated or discontinuous, each belong to a constituent part (2', 2'') of the casing (2), and the perforated wall portions (6) are advantageously interlocked by fitting between the two constituent parts (2', 2'') or integrated with the latter.

10. Battery device according to claim 1, wherein the slots or flanges with aerodynamic profiles are mounted in aeration openings made in the perforated wall portions (6).

11. Battery device according to claim 1, wherein when the battery unit (3) is an integral or one-piece product, the battery elements (4) are placed longitudinally in the direction of the thickness (E) and perpendicular to the two primary faces of the rectangular parallelepiped that is formed by the casing (2).

12. Battery device according to claim 11, further comprising both continuous peripheral sealing means (17, 17'') between the compartmentalization means (7, 7') and the continuous wall portions (5, 5') of the casing (2), as well as individual sealing means (18) between the ends (4', 4'') of each of the battery elements (4) and the compartmentalization means (7, 7'), either at the ends (4', 4'') of the cylindrical bodies (4''') of the battery elements (4) or at the lateral face of end portions (16) of said cylindrical bodies (4'''), set back in relation to said ends (4', 4'').

13. Battery device according to claim 11, wherein the compartmentalization means (7, 7') consist of plates that are provided with cut-outs (15'), each surrounded by an annular relief (15) that receives the end portion (16) of a battery element (4), and wherein a circumferential sealing means (18) is present between the perforated plate (7, 7') in question and the end (4', 4'') in question of the battery element (4) in question, at each cut-out (15'), with said plates (7, 7') resting against and/or on said end portions (16), with insertion of said sealing means (18).

14. Battery device according to claim 11, wherein each compartmentalization means (7, 7') in the form of a perforated plate is received by cooperating and wedged engagement of its peripheral edge (7'''), and with insertion of a sealing means (17), in, against, or on a continuous inner formation (19) of the corresponding continuous or airtight wall portion (5, 5') of the casing (2), with this formation consisting of, for example, a shoulder, a flange, a wing, a rib, a groove, or the like.

15. Battery device according to claim 1, wherein when the battery unit (3) consists of the mechanical and electrical association of at least two sub-units (3'''), each sub-unit (3''') comprises at least one row, all oriented longitudinally in the direction of the height (H) or the width (L) of the rectangular parallelepiped that is formed essentially by the casing (2) and placed parallel to the primary faces of the latter, with said sub-units (3''') being either placed on top of one another like stages of battery elements (4) in the direction of the height (H), or adjacent to one another laterally in the direction of the width (L), with constitution and insertion of an airtight intermediate housing (8) between two adjacent sub-units (3'''), with an end airtight housing (8'') being present at each of the opposite ends of the battery unit (3).

16. Battery device according to claim 15, wherein each intermediate airtight housing (8) consists of two compartmentalization means (7 and 7') in the form of plates equipped with peripheral edges (20, 20') that coincide and work together by airtight assembly, in the manner of two complementary shells, with the battery unit (3) comprising at least one interstitial airtight housing (8) that is located between two sub-units (3''') and two end housings (8') located at the two opposite longitudinal ends of the battery unit (3).

17. Battery device according to claim 16, wherein the edge (20) of one (7) of the two compartmentalization plates (7, 7') of each intermediate airtight housing (8) has a groove or undercut structure and wherein the edge (20') of the other one (7') of the two compartmentalization plates has a structure with at least one rib or wing, able and designed to be fitted into said groove or undercut, in such a way as to create a baffle between the two assembled edges (20 and 20'), with a seal (21) being present in said groove (20) or on said rib (20').

18. Battery device according to claim 17, wherein the assembly by fitting in the area of the edges (20, 20') of two compartmentalization plates (7 and 7') is locked by elastic snapping-on of cooperating supplementary means (20'') of the catch/notch type.

19. Battery device according to claim 15, further comprising both intermediate airtight housings (8), located between two sub-units (3''') of elements (4) that are placed one on top of another or adjacent and housing the interconnecting means (10) of the accessible electrical connecting zones (9, 9') of the elements (4) of the two sub-units (3''') in question, as well as end airtight housings (8'), located at the lower or upper edge or a lateral edge of an arrangement of sub-units (3''') that are placed one on top of another or adjacent, and of which the outer-compartmentalization plate (7, 7') has no cutout (15'') and constitutes a continuous wall (5'').

20. Battery device according to claim 1, further comprising a rigid harness (26) that is added by hooking with releasable locking to the casing (2), at the hooking points (25) of the latter.

21. Battery device according to claim 1, further comprising a carrying handle (23), integrated with one of the two constituent parts (2', 2'') of the casing (2) or consisting of the assembly of the two parts (2', 2'').

22. Battery device according to claim 1, wherein the battery elements (4) are of the lithium-ion or polymer lithium type, and wherein the casing (2) and the compartmentalization means (7, 7') are made of a thermoplastic material, with at least the layer of outside material of the battery elements (4) being of a type that is resistant to attacks from the surrounding environment.

23. Portable electric power tool set comprising at least two components that are connected by a cable, namely a tool that integrates at least one actuator and an autonomous power supply in the form of a battery device, set wherein the battery device is a battery device according to claim 1.

* * * * *